United States Patent
Song

(10) Patent No.: US 10,670,865 B2
(45) Date of Patent: Jun. 2, 2020

(54) HEADS-UP DISPLAY DEVICE FOR VEHICLE

(71) Applicant: HYUNDAI MOBIS CO., LTD., Seoul (KR)

(72) Inventor: Ki Hyuk Song, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 8 days.

(21) Appl. No.: 16/012,573

(22) Filed: Jun. 19, 2018

(65) Prior Publication Data

US 2018/0373029 A1 Dec. 27, 2018

(30) Foreign Application Priority Data

Jun. 22, 2017 (KR) .................. 10-2017-0079086

(51) Int. Cl.
| | |
|---|---|
| G02B 27/01 | (2006.01) |
| G02B 27/30 | (2006.01) |
| G02B 5/02 | (2006.01) |
| G02B 3/02 | (2006.01) |
| G02B 1/11 | (2015.01) |
| G02B 3/08 | (2006.01) |
| B60K 35/00 | (2006.01) |
| G02B 19/00 | (2006.01) |
| G02B 3/00 | (2006.01) |

(52) U.S. Cl.
CPC .......... *G02B 27/0101* (2013.01); *B60K 35/00* (2013.01); *G02B 3/0068* (2013.01); *G02B 5/0231* (2013.01); *G02B 19/0014* (2013.01); *G02B 19/0061* (2013.01); *G02B 27/30* (2013.01); *B60K 2370/331* (2019.05); *B60K 2370/39* (2019.05); *G02B 1/11* (2013.01); *G02B 2027/0118* (2013.01)

(58) Field of Classification Search
CPC .............. G02B 27/0101; G02B 3/0068; G02B 19/0014; G02B 19/0061; G02B 1/11; G02B 27/30; G02B 2027/0118; G02B 3/08; G02B 5/0231; B60K 35/00; B60K 2370/331; B60K 2370/39

See application file for complete search history.

(56) References Cited

U.S. PATENT DOCUMENTS

| 2014/0022222 A1* | 1/2014 | Kuo | ................ G02B 5/021 345/205 |
|---|---|---|---|
| 2014/0022511 A1* | 1/2014 | Kuo | .............. G02B 5/0221 353/10 |

(Continued)

FOREIGN PATENT DOCUMENTS

| JP | 2014112147 A | * | 6/2014 | | |
|---|---|---|---|---|---|
| WO | WO-2018142610 A1 | * | 8/2018 | ............ | B60K 35/00 |

*Primary Examiner* — Julie Anne Watko
(74) *Attorney, Agent, or Firm* — Knobbe Martens Olson & Bear LLP

(57) ABSTRACT

A head-up display device for a vehicle may include: a light source part configured to generate light; a lens part configured to concentrate the light irradiated from the light source part; a film part configured to make a scattering angle of the light different in horizontal and vertical directions, the light having passed through the lens part; and an image generation part configured to generate image information using the light having passed through the film part.

7 Claims, 8 Drawing Sheets

(56) References Cited

U.S. PATENT DOCUMENTS

| | | | |
|---|---|---|---|
| 2015/0062470 A1* | 3/2015 | Sumi | G02B 27/2214 |
| | | | 349/15 |
| 2016/0266283 A1* | 9/2016 | Segawa | G02B 3/0006 |
| 2016/0320616 A1* | 11/2016 | Ichii | G02B 27/0179 |
| 2017/0191637 A1* | 7/2017 | Gommans | F21V 5/002 |
| 2018/0116023 A1* | 4/2018 | Schmidt | H05B 37/0272 |
| 2018/0321488 A1* | 11/2018 | Usukura | G02B 3/06 |
| 2018/0348512 A1* | 12/2018 | Chiba | B60K 35/00 |
| 2019/0126824 A1* | 5/2019 | Oba | B60R 1/00 |
| 2019/0373249 A1* | 12/2019 | Kato | H04N 13/31 |

* cited by examiner

HEADS-UP DISPLAY DEVICE FOR VEHICLE

CROSS-REFERENCES TO RELATED APPLICATIONS

The present application claims priority to Korean application number 10-2017-0079086, filed on Jun. 22, 2017, which is incorporated by reference in its entirety.

BACKGROUND OF THE INVENTION

The present invention relates to a head-up display for a vehicle, and more particularly, to a head-up display device for a vehicle, which can improve the brightness and uniformity of an image, thereby increasing an image quality while reducing a manufacturing cost.

In general, a head-up display device refers to a system which provides driving information or other information within a range that does not deviate from the front view of a driver, i.e. the main visual line of sight of the driver, while a vehicle or airplane is driven.

Generally, it takes about two seconds for a driver to fix his view to the road after checking a dashboard. In this case, a vehicle driven by the driver moves about 55 m under the supposition that the vehicle is driven at a speed of about 100 km/h. Therefore, a risk is inevitably present. As one of methods for reducing such a risk, a head-up display device may be selected.

The head-up display device displays information (speed, traveling distance, RPM and the like) of the dashboard on the windshield of the vehicle, such that the driver can easily recognize the traveling information.

The head-up display device according to the related art includes a plurality of lenses having different functions, in order to implement image information on the windshield. Therefore, the manufacturing cost is inevitably increased. Furthermore, when the driver's eyes are exposed to direct sunlight, the driver may have difficulties in stably recognizing image information due to low image brightness. Therefore, there is a demand for a device capable of solving the problem.

The related art of the present invention is disclosed in Korean Patent Registration No. 10-0813492 published on Mar. 7, 2008 and entitled "Head-up display device for vehicle".

SUMMARY OF THE INVENTION

Embodiments of the present invention are directed to a head-up display device for a vehicle, which can improve the brightness and uniformity of an image, thereby increasing an image quality while reducing a manufacturing cost.

In one embodiment, a head-up display device for a vehicle may include: a light source part configured to generate light; a lens part configured to concentrate the light irradiated from the light source part; a film part configured to make a scattering angle of the light different in horizontal and vertical directions, the light having passed through the lens part; and an image generation part configured to generate image information using the light having passed through the film part.

The light source part may include an LED.

The lens part may include a collimator for making light travel in a straight direction.

The lens part may include a Fresnel lens for making light travel in a straight direction.

The film part may include a microlens array sheet.

The film part may include: a sheet part; and a plurality of incident microlens parts formed on one side of the sheet part, and arranged in a checkerboard shape.

The incident microlens part may have horizontal and vertical curvatures different from each other.

Horizontal and vertical distances between the incident microlens parts may be equal to or different from each other.

The film part may further include a plurality of emission microlens parts formed on the other side of the sheet part, and arranged in a checkerboard shape.

The emission microlens part may protrude toward the image generation part so as to guide light.

The head-up display device may further include an anti-lens part applied to any one of the lens part and the film part so as to prevent light reflection.

DESCRIPTION OF SPECIFIC EMBODIMENTS

Hereafter, a head-up display device for a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
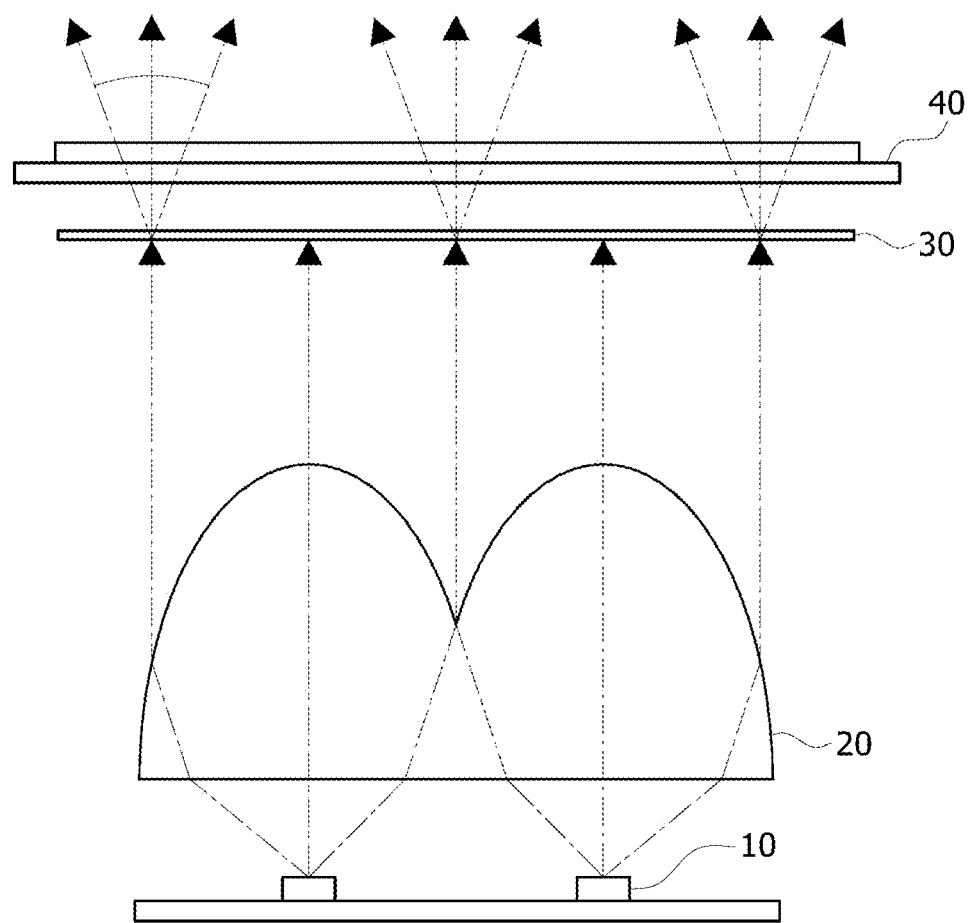
FIG. 1 is a schematic plan view illustrating a head-up display device for a vehicle in accordance with an embodiment of the present invention.
Figure 2:
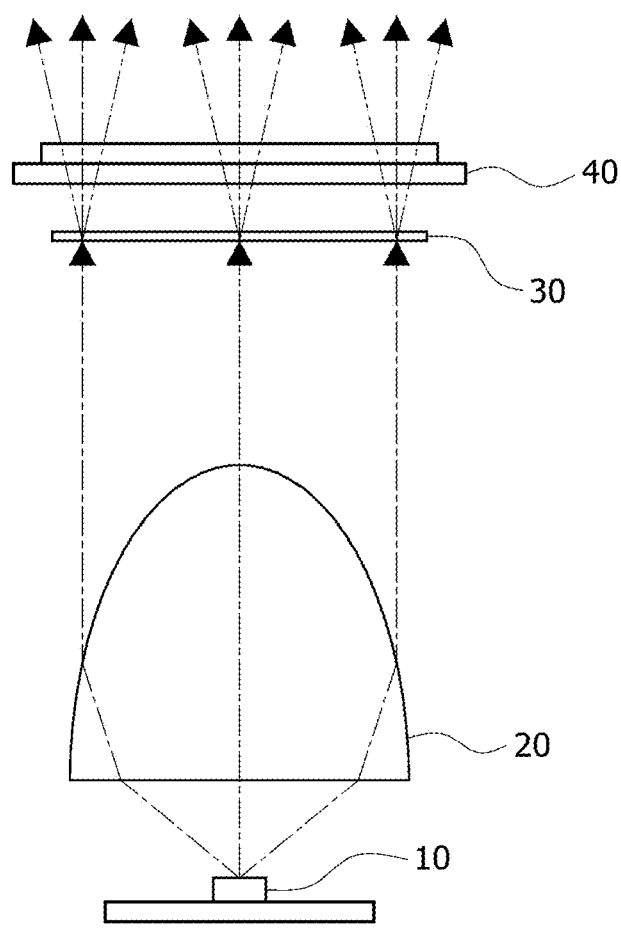
FIG. 2 is a schematic side view illustrating the head-up display device for a vehicle in accordance with the embodiment of the present invention.

FIG. 1 is a schematic plan view illustrating a head-up display device for a vehicle in accordance with an embodiment of the present invention, and FIG. 2 is a schematic side view illustrating the head-up display device for a vehicle in accordance with the embodiment of the present invention. Referring to FIGS. 1 and 2, the head-up display device 1 for a vehicle in accordance with the embodiment of the present invention may include a light source part 10, a lens part 20, a film part 30 and an image generation part 40.

The light source part 10 may generate light, and the lens part 20 may concentrate the light emitted from the light source part 10. The film part 30 may secure lighting uniformity by making the scattering angle of light different in horizontal and vertical directions, the light having passed through the lens part 20. The image generation part 40 may generate image information using the light having passed through the film part 30. For example, the image generation part 40 may include an LCD panel.

The light source part 10 may include an LED. Furthermore, laser light may be used as the light source part 10. In addition, various light sources may be employed as the light source part 10.

The lens part 20 may serve as a collimator that causes the direction of light to become aligned in a straight direction. More specifically, the lens part 20 which is a kind of concentrating lens may have a plurality of constant thicknesses in order to reduce a thickness, and a Fresnel lens for making light travel in a straight direction may be used as the lens part 20.

At this time, the light source parts 10 and the lens parts 20 may be arranged to correspond one-to-one to each other. Furthermore, the light source parts 10 and the lens parts 20 may be vertically and horizontally arranged according to a lighting region of the image generation part 40.

Figure 3:
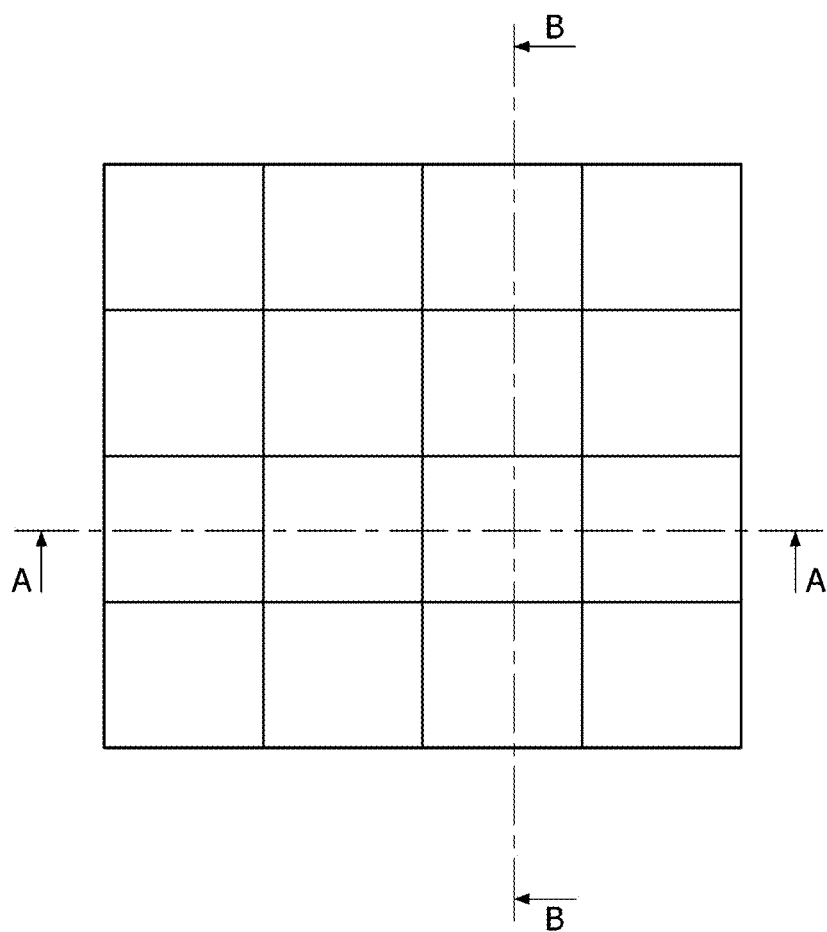
FIG. 3 schematically illustrates a film part of the head-up display device for a vehicle in accordance with the embodiment of the present invention.
Figure 4A:
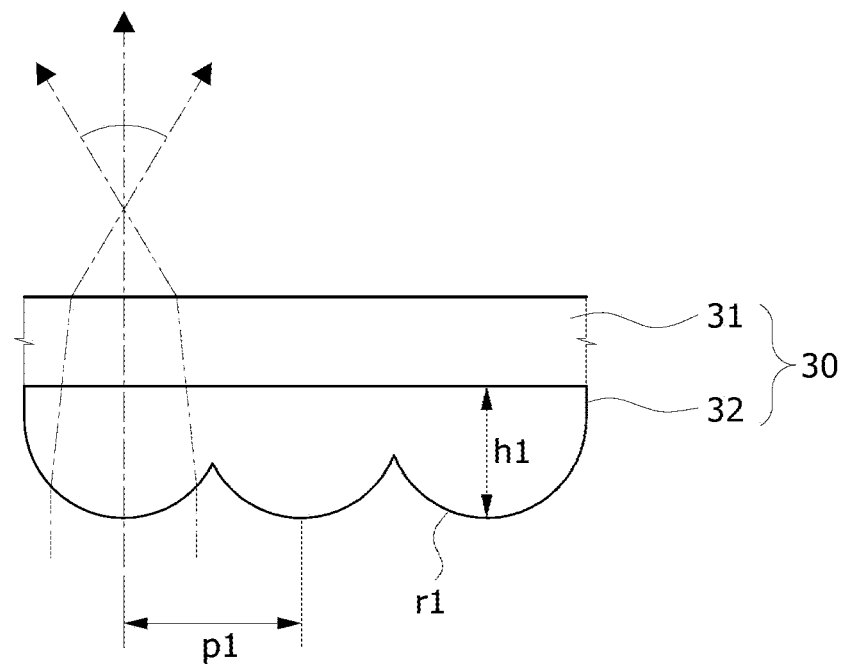
FIGS. 4A and 4B are a cross-sectional view taken along the line A-A of FIG. 3.
Figure 4B:
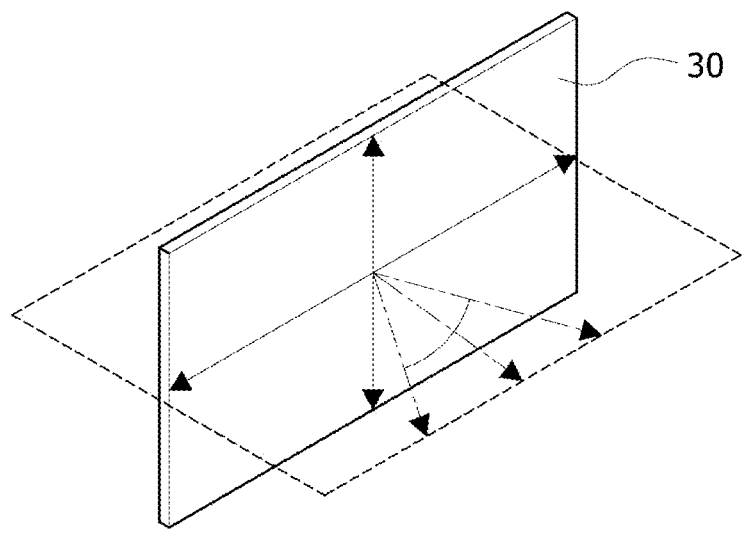
Figure 5A:
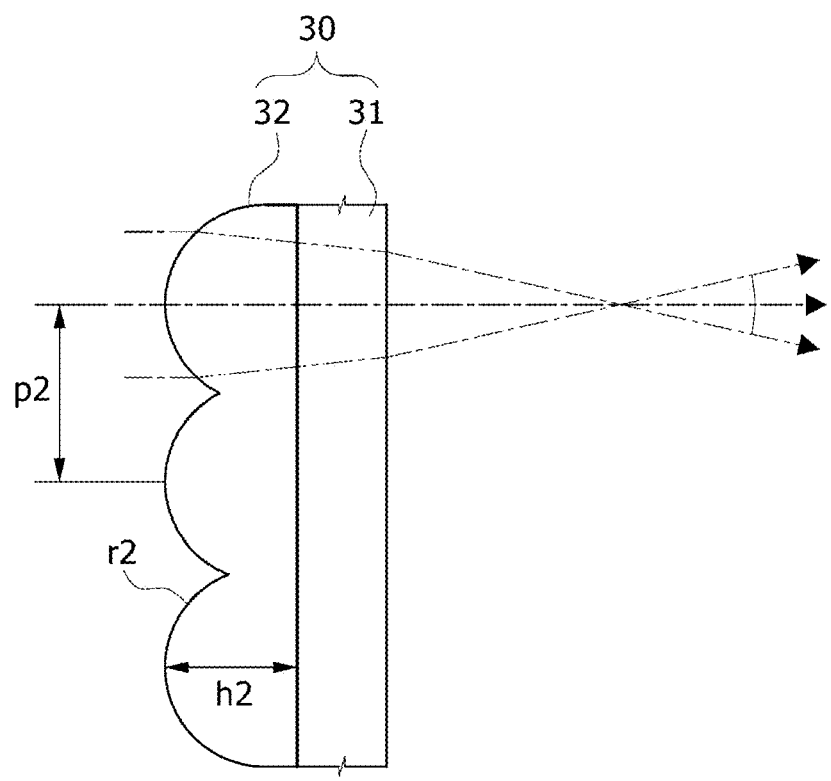
FIGS. 5A and 5B are a cross-sectional view taken along the line B-B of FIG. 3.
Figure 5B:
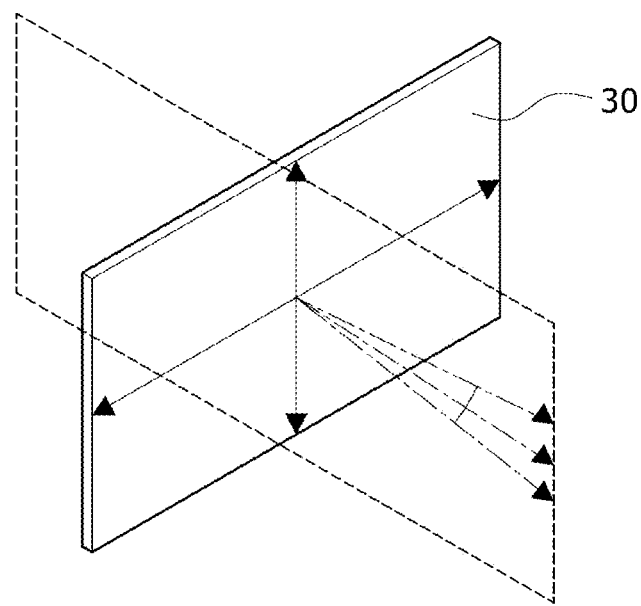
Figure 6:
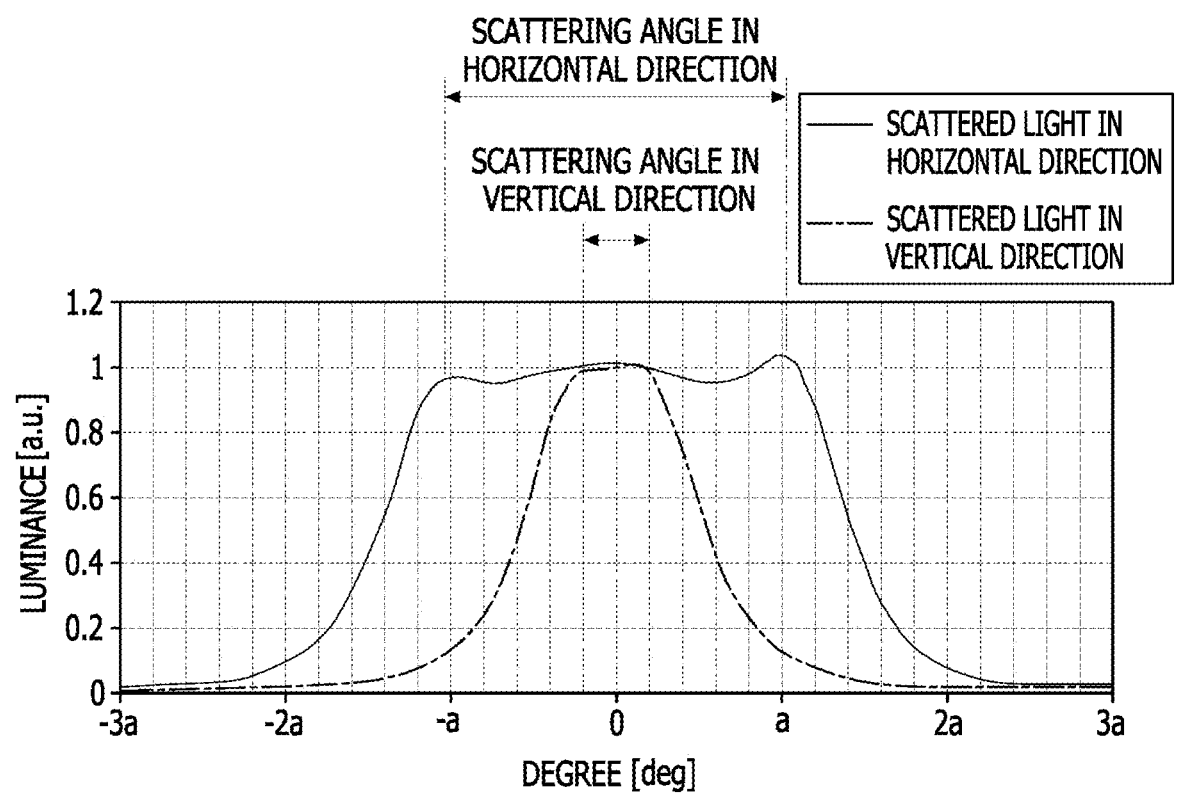
FIG. 6 schematically illustrates scattered energy distribution by the film part in the head-up display device for a vehicle in accordance with the embodiment of the present invention.

FIG. 3 schematically illustrates the film part in the head-up display device for a vehicle in accordance with the embodiment of the present invention, FIGS. 4A and 4B are a cross-sectional view taken along the line A-A of FIG. 3, and FIGS. 5A and 5B are a cross-sectional view taken along the line B-B of FIG. 3. FIG. 6 schematically illustrates scattered energy distribution by the film part in the head-up display device for a vehicle in accordance with the embodiment of the present invention. Referring to FIGS. 3 to 6, the film part 30 in accordance with the embodiment of the present invention may include a microlens array sheet which has different scattering angles in the horizontal and vertical directions.

That is, light having passed through the film part 30 may implement a virtual image through a mirror optical system, and the scattering angles of the film part 30 in the horizontal and vertical directions may compensate for the chief ray angles of the mirror optical system in the horizontal and vertical directions, which makes it possible to improve the image uniformity and brightness of the virtual image.

The film part 30 may cause anisotropic scattering in the horizontal and vertical directions, and have scattered energy distribution symmetrical with respect to the center. Furthermore, scattered energy distribution in a predetermined angle range may exhibit a uniform top-hat distribution (refer to FIG. 6), such that the uniform light uniformity can be secured in a section recognized by the driver. The light scattered in the horizontal and vertical directions of the film part 30 may be radiated in a rectangular shape, thereby maximizing lighting efficiency.

The film part 30 in accordance with the embodiment of the present invention may include a sheet part 31 and a plurality of incident microlens parts 32. The sheet part 31 may be mounted in a housing in which the light source part 10 and the lens part 20 are embedded. The plurality of incident microlens parts 32 may be formed on one surface of the sheet part 31, and arranged in a checkerboard shape.

For example, the incident microlens parts 32 may protrude toward the lens part 20 so as to guide light. The incident microlens parts 32 may be arranged in a hexagonal shape as well as the checkerboard shape. Furthermore, the incident microlens parts 32 may be arranged in various shapes to cause anisotropic scattering in which scattering angles in the horizontal and vertical directions are different from each other, and have a size of 20 to 40 μm.

Referring to FIGS. 4 and 5, a horizontal curvature r1 of the incident microlens part 32 may be different from a vertical curvature r2 thereof, and a horizontal distance p1 between the incident microlens parts 32 may be equal to or different from a vertical distance p2 between the incident microlens parts 32.

More specifically, a plurality of incident microlens parts 32 may be arranged in the horizontal direction, and a plurality of incident microlens parts 32 may be arranged in the vertical direction. At this time, the horizontal curvature r1 and the vertical curvature r2 of any one incident microlens part 32 may be different from each other, and the horizontal distance p1 and the vertical distance p2 may be equal to or different from each other.

That is, the horizontal and vertical heights, curvatures and distances of the incident microlens parts 32 may be adjusted so that the scattering angles in the horizontal and vertical directions are different from each other.

In addition, the horizontal height h1, the horizontal curvature r1 and the horizontal distance p1 of the incident microlens parts 32 arranged at an odd row among the plurality of incident microlens parts 32 arranged in a checkerboard shape may be different from those of the incident microlens parts 32 arranged at an even row.

Similarly, the vertical height h2, the vertical curvature r2 and the vertical distance p2 of the incident microlens parts 32 arranged at an odd row among the plurality of incident microlens parts 32 arranged in a checkerboard shape may be different from those of the incident microlens parts 32 arranged at an even row.

Figure 7:
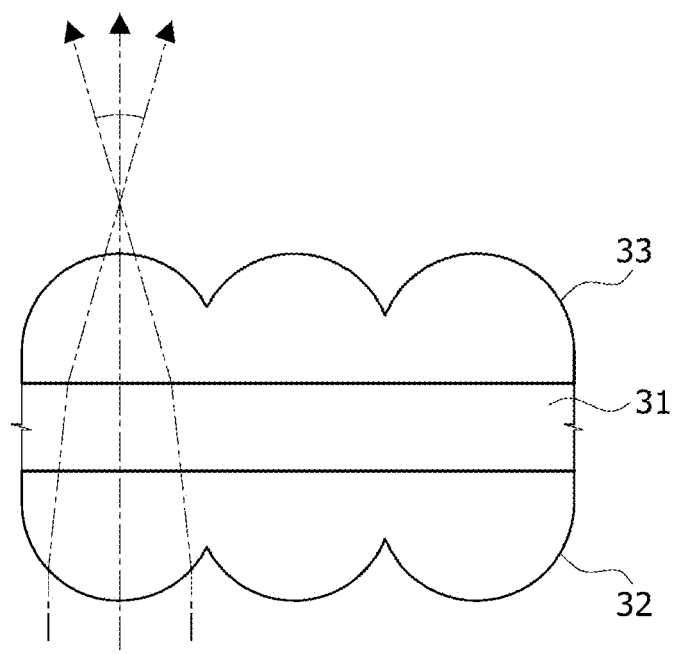
FIG. 7 schematically illustrates that emission microlens parts are added to the film part in the head-up display device for a vehicle in accordance with the embodiment of the present invention.

FIG. 7 schematically illustrates that emission microlens parts are added to the film part in the head-up display device for a vehicle in accordance with the embodiment of the present invention. Referring to FIG. 7, the film part 30 may further include a plurality of emission microlens parts 33.

The plurality of emission microlens parts 33 may be formed on the other surface of the sheet part 31, and arranged in a checkerboard shape. For example, the emission microlens parts 33 may protrude toward the image generation part 40 so as to guide light. The emission microlens parts 33 may be arranged in a hexagonal shape as well as the checkerboard shape. Furthermore, the emission microlens parts 33 may be arranged in various shapes to cause anisotropic scattering in which scattering angles in the horizontal and vertical directions are different from each other. The emission microlens part 33 may be designed in the same manner as the incident microlens part 32 of FIGS. 4 and 5.

Figure 8:
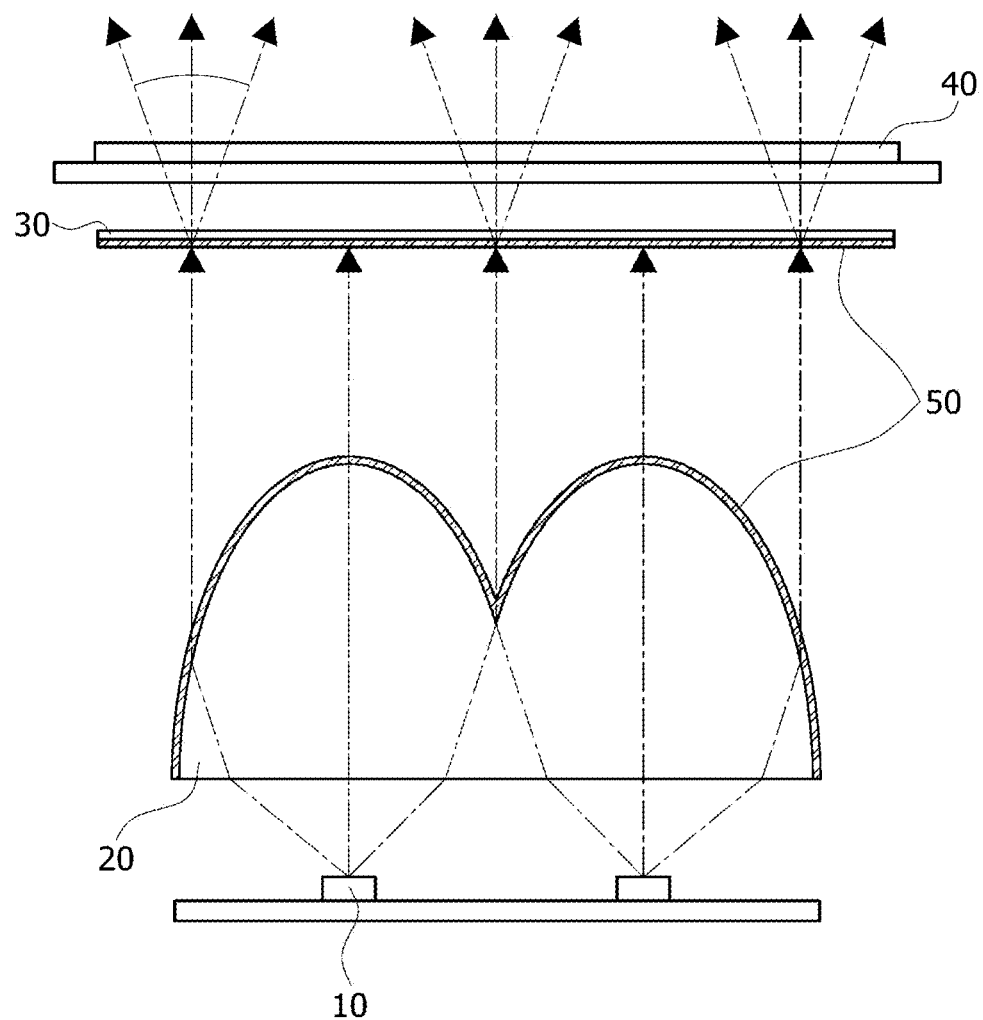
FIG. 8 schematically illustrates an anti-reflection part of the head-up display device for a vehicle in accordance with the embodiment of the present invention.

FIG. 8 schematically illustrates an anti-reflection part in the head-up display device for a vehicle in accordance with the embodiment of the present invention. Referring to FIG. 8, the head-up display device 1 for a vehicle in accordance with the embodiment of the present invention may further include an anti-reflection part 50. The anti-reflection part 50 may include an anti-reflection material which is applied to one or more of the lens part 20 and the film part 30, in order to prevent light reflection. The lens part 20 and the film part 30 may include a synthetic resin or glass material.

The operation of the head-up display device for a vehicle in accordance with the embodiment of the present invention will be described as follows.

When power is applied, light generated by the light source part 10 may sequentially pass through the lens part 20 and the film part 30, and reach the image generation part 40.

At this time, the lens part 20 may concentrate the light to make the light travel in a straight direction, and the film part 30 may secure lighting uniformity by making the scattering angle of the light different in the vertical and horizontal directions.

The image generation part 40 may generate image information by selectively passing the irradiated light. The image information generated through the image generation part 40 may be transferred to the windshield through the mirror optical system, such that the driver recognizes the image information.

The film part 30 may scatter light through the plurality of incident microlens parts 32 arranged in a checkerboard shape on one side of the sheet part 31 mounted in the housing. At this time, the plurality of emission microlens parts 33 can be arranged in a checkerboard shape on the other side of the sheet part 31, thereby improving the uniformity of emitted light.

Since the head-up display device 1 for a vehicle in accordance with the embodiment of the present invention implements image information through the light source part 10, the lens part 20, the film part 30 and the image generation part 40, the whole length can be shortened while the cost is reduced.

In the head-up display device 1 for a vehicle in accordance with the embodiment of the present invention, the film part 30 can improve the lighting uniformity by making the scattering angle of light different in the horizontal and vertical directions.

The head-up display device 1 for a vehicle in accordance with the embodiment of the present invention can improve lighting efficiency through the anti-reflection part 50 applied to the lens part 20 and the film part 30.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A head-up display device for a vehicle, comprising:
   a light source configured to generate light beams;
   a lens configured to transmit the light beams irradiated from light source in a forward direction;
   a film configured to scatter the light beams transmitted from the lens in horizontal and vertical directions, wherein the film comprises a sheet and a microlens array attached to a surface of the sheet facing the lens, wherein the microlens array comprises a plurality of microlenses arranged in the horizontal and vertical directions, each of the plurality of microlenses having a horizontal curvature and a vertical curvature different from the horizontal curvature such that a horizontal scattering angle of the light beams is different from a vertical scattering angle of the light beams, wherein the plurality of microlenses in odd rows have a horizontal curvature different from that of the plurality of microlenses in even rows; and
   an image generator configured to generate, using the light beams having been scattered by the film, an image to be displayed on a windshield of the vehicle.

2. The head-up display device of claim 1, wherein the light source comprises an LED.

3. The head-up display device of claim 1, wherein the lens comprises a collimator.

4. The head-up display device of claim 1, wherein the lens comprises a Fresnel lens.

5. The head-up display device of claim 1, wherein the film further comprises a plurality of emission microlenses formed on a surface of the sheet facing away, from the lens.

6. The head-up display device of claim 5, wherein each emission microlens protrudes toward the image generator.

7. The head-up display device of claim 1, further comprising an anti-reflection layer over any one of the lens and the film so as to prevent light reflection.

* * * * *